United States Patent
Jin et al.

(10) Patent No.: US 7,505,593 B2
(45) Date of Patent: Mar. 17, 2009

(54) METHOD FOR TRACING TRAITORS AND PREVENTING PIRACY OF DIGITAL CONTENT IN A BROADCAST ENCRYPTION SYSTEM

(75) Inventors: Hongxia Jin, San Jose, CA (US); Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 10/315,395

(22) Filed: Dec. 9, 2002

(65) Prior Publication Data

US 2004/0111611 A1 Jun. 10, 2004

(51) Int. Cl.
*H04N 7/167* (2006.01)
(52) U.S. Cl. .................. 380/242; 380/201; 380/278
(58) Field of Classification Search .................. None
See application file for complete search history.

(56) References Cited

U.S. PATENT DOCUMENTS

| | | | |
|---|---|---|---|
| 5,272,752 A | 12/1993 | Myers et al. | |
| 5,592,552 A | 1/1997 | Fiat | |
| 5,651,064 A | 7/1997 | Newell | |
| 5,949,885 A | 9/1999 | Leighton | |
| 6,285,774 B1 | 9/2001 | Schumann et al. | |
| 6,289,455 B1 | 9/2001 | Kocher et al. | |
| 6,370,272 B1 | 4/2002 | Shimizu | |
| 6,381,367 B1 | 4/2002 | Ryan | |
| 6,839,436 B1* | 1/2005 | Garay et al. | 380/278 |
| 2001/0047502 A1* | 11/2001 | Hattori et al. | 714/777 |
| 2002/0044320 A1* | 4/2002 | Pfeiffer et al. | 359/136 |
| 2002/0141582 A1 | 10/2002 | Kocher et al. | |
| 2003/0169885 A1* | 9/2003 | Rinaldi | 380/278 |

FOREIGN PATENT DOCUMENTS

WO    WO 99/19822    4/1999

(Continued)

OTHER PUBLICATIONS

Pfitzmann et al., "Asymmetric Fingerprinting for Larger Collusions," (c)1997, ACM Press, pp. 151-160.*

(Continued)

*Primary Examiner*—Emmanuel L Moise
*Assistant Examiner*—Nadia Khoshnoodi
(74) *Attorney, Agent, or Firm*—Mark McSwain; Shimokaji & Associates, PC

(57) ABSTRACT

A method for disabling a traitor receiver in a broadcast encryption system includes examining augmentations of at least one redistributed version of a file in a group of files, wherein each authorized receiver acquired decryption keys only for the particular augmentations that it used. A level to which the augmentations correspond to a first set of super codes previously assigned to each authorized receiver is determined. A conclusion is drawn regarding the number of receivers that are traitor receivers. The receivers concluded to be traitor are selectively revoked. The process is repeated by selecting another set of super codes; selected to reduce the number of authorized receivers concluded to be traitor receivers. The sets of super codes are selected such that the number is made larger to achieve quicker revocation of a traitor receiver at the cost of increasing chance of an incorrect revocation of an innocent receiver.

8 Claims, 6 Drawing Sheets

FOREIGN PATENT DOCUMENTS

WO    WO 01/22406 A1    3/2001

OTHER PUBLICATIONS

Pfitzmann et al.; "Asymmetric Fingerprinting for Larger Collusions," (c)1997, ACM Press, pp. 151-160.*

Wicker, Stephen "Error Control Systems for Digital Communication and Storage" © 1995 by Prentice-Hall Inc., p. 176, paragraph 2 and p. 188, paragraph 4.*

Pfitzmann et al., "Trials of Traced Traitors," (c)1996 Workshop on Information Hiding, pp. 1-14.*

Silverberg et al., "Applications of List Decoding to Tracing Traitors," (c)2001 Asiacrypt, pp. 5-6.*

Yoshida, Maki et al. "A Subscriber-Excluding and Traitor-Tracing Broadcast Distribution System", IEICE Transactions on ☐☐Fundamentals of Electronics, Communications, and Computer Sciences, vol. E84-A, No. 1, Jan. 1, 2001. pp. 247-255.*

Reitmeier et al., "Secure Information Distribution System Utilizing Information Segment Scrambling", United States Patent Application Publication, Jan. 10, 2002, U.S. Appl. No. 09/182,933.

B. Chor et al., "Tracing Traitors", IEEE Transactions on Information Theory, vol. 46, No. 3, May 2000, pp. 893-910.

A. Barg et al., "Good Digital Fingerprinting Codes", IEEE Transactions on Information Theory, Proceedings of IEEE International Symposium on Information Theory, Jun. 24-29, 2001 Washington, D.C., p. 161.

M. Yoshida et al., "An efficient traitor tracing scheme for broadcast encryption", IEEE Transactions on Information Theory, Proceedings of Symposium on Information Theory, Jun. 25-30, 2000, Sorrento, Italy, p. 463.

D. Boneh et al., "Collusion-Secure Fingerprinting for Digital Data", IEEE Transactions on Information Theory, vol. 44, No. 5, Sep. 1998, pp. 1897-1905.

* cited by examiner

METHOD FOR TRACING TRAITORS AND PREVENTING PIRACY OF DIGITAL CONTENT IN A BROADCAST ENCRYPTION SYSTEM

FIELD OF THE INVENTION

This invention relates to preventing piracy of digital content in a broadcast encryption system and more specifically to both probabilistically and deterministically tracing traitors who may be colluding to redistribute such content and/or related decryption keys.

CROSS-REFERENCE TO RELATED APPLICATION

This invention is related to five commonly-owned U.S. patent applications, each of which is hereby incorporated by reference, including:
U.S. Ser. No. 09/770,877, filed Jan. 26, 2001, entitled "Method for Broadcast Encryption and Key Revocation of Stateless Receivers", now U.S. Pat. No. 7,039,803.
U.S. Ser. No. 09/771,239, filed Jan. 26, 2001, entitled "Method for Tracing Traitor Receivers in a Broadcast Encryption System", now U.S. Pat. No. 7,010,125.
U.S. Ser. No. 09/777,506, filed Feb. 5, 2001, entitled "Method for Assigning Encryption Keys", now U.S. Pat. No. 6,888,944.
U.S. Ser. No. 09/789,451, filed Feb. 20, 2001, entitled "Method for Assigning Encryption Keys", now U.S. Pat. No. 6,947,563.
U.S. Ser. No. 10/042,652, filed Jan. 8, 2002, entitled "Method for Ensuring Content Protection and Subscription Compliance", now published as U.S. Patent Application 20020104001A1.

BACKGROUND OF THE INVENTION

The widespread transition of data from analog format to digital format has exacerbated problems relating to unauthorized copying and redistribution of protected content. Flawless copies of content can be easily produced and distributed via the Internet. This piracy is a major concern and expense for content providers.

Further, a new type of home consumer device for digital content management has been enabled by the advent of inexpensive, large-capacity hard disks. A movie rental box receives digital movies from some inexpensive source of data, usually a broadcast source (whether terrestrial or satellite-based). The movies do not have to be delivered in real time. Instead, they are stored on the hard disk, so that at any moment the hard disk contains, for example, the hundred hottest movies in the rental market. The consumer can simply select a particular movie and hit "play" to begin viewing a movie. The movie rental box periodically calls a clearing center and reports the consumer's content usage for billing purposes; the box may also acquire new decryption keys during this call.

The advantages the box provides to the consumer are obvious: he or she no longer has to go to the video rental store, and perhaps more importantly, does not have to return a rental tape or DVD. The consumer value proposition of movie rental boxes is so compelling it is estimated that there will be 20 million such boxes in the United States within five years.

Content providers need to know what security problems are associated with these boxes, i.e. how can a user get a movie without paying for it? The simple attack of merely disconnecting the box so that it cannot call the clearing center can achieve only a short-lived advantage because the clearing center can simply refuse to provide new decryption keys to such a box. Likewise, the periodic "calling home" makes detection of clone boxes relatively easy. The most serious attack is likely to be the so-called "anonymous" attack, wherein a user or a group of users purchase rental movies from legitimate movie rental boxes that have been instrumented so that the protected content and/or the decryption keys can be captured and redistributed, often over the Internet. This Napster-style attack with movies instead of music is the most urgent concern of the movie studios that are investigating content protection technology.

One solution to the problem is to differently watermark and differently encrypt each movie for each authorized movie rental box, so that if a movie were pirated the watermarking and encryption information would uniquely identify the compromised box. Alas, this solution is not feasible because of the excessive computing effort and transmission bandwidth required to prepare and transmit individualized movies. The distribution system is economical only if the movies can be distributed over broadcast channels, i.e. where every box gets substantially the same data at the same time.

To solve the broadcast problem, the approach known in the art as "tracing traitors" is used. In this approach, an original version of each movie file has been augmented before being broadcast. Specifically, the file that is actually broadcast has had at least one critical file segment replaced by a set of segment variations. Each file segment variation is differently encrypted and preferably also differently watermarked prior to encryption, although the entire file may be watermarked as well. All the variations in one segment are identical for viewing purposes. A receiver is given the cryptographic key to decrypt only one of the variations in each segment. If the receiver is compromised and is used to illegally rebroadcast either the keys or the segments themselves, it is possible to deduce which receiver or receivers have been compromised.

The tracing traitors approach has not been widely used in practice to date, because previously known methods required unreasonable amounts of bandwidth in the broadcast, due to the number of segments or variations required. This invention substantially reduces the bandwidth required.

An improved prior art solution using the tracing traitors approach is described in PCT patent application WO 99/19822 "System and Method for Discovering Compromised Security Devices" by Birdwell et al. The Birdwell abstract states:

"A data delivery system has a content server or other mechanism for delivering encoded content to multiple authorized clients. The authorized clients are equipped with security devices having decoding capabilities to decode the content. Unauthorized clients are prevented from decoding the content because they are not supplied with the decoding capabilities. As part of the data delivery system, a traitor detection system is provided to discover an identity of an authorized client that has been compromised and is illicitly transferring decoding capabilities to unauthorized clients. The traitor detection system generates different decoding capabilities and creates an association file which relates the different decoding capabilities to different authorized clients. The decoding capabilities are traced to determine which of them is illicitly transferred to an illegitimate user. In the event that one of the decoding capabilities is illicitly transferred, the traitor detection system consults the association file to identify one or more of the authorized clients that were originally supplied with the illicitly transferred decoding capabilities. The identified set of clients includes the compromised client. The process is repeated for the identified set of clients with a new set of decoding capabilities to successively narrow the field of possible pirating clients, until the compromised security device is precisely pinpointed."

The Birdwell invention, however, requires the broadcaster to dynamically change the segment variations assigned to the individual receivers on the fly, based on instantaneous feedback on the rebroadcasted data. This simply does not work for applications like rental movie boxes, because the pirates have no urgent need to immediately rebroadcast the movies. For example, they can wait for months without losing substantial revenue, if that will help them defeat a tracing traitors scheme.

A method of distributing protected content that combats piracy and enables identification and revocation of compromised receivers in a broadcast encryption system without excessive transmission bandwidth overhead is therefore needed.

SUMMARY OF THE INVENTION

It is accordingly an object of this invention to provide a method, system, and program product for distributing files in a broadcast encryption system to prevent piracy and to enable traitor tracing. Distribution generally includes preparing files for transmission, broadcasting files, and receiving and preparing files for authorized use. Distribution means may include computer networks, satellite networks, cable networks, television transmissions, and physical storage media. Files may comprise any kind of digital data sequence, including but not limited to text, audio, images, video, music, movies, multimedia presentations, operating systems, video games, software applications, and cryptographic keys.

It is a related object of the invention to provide a method for identifying traitorous receivers who redistribute files without authorization, and disabling such traitors to prevent similar redistribution in the future. Legal action may be taken against identified traitors, and traitors may be excluded from the list of receivers for whom new decryption keys are created and subsequently broadcast, i.e. that set of receivers is cryptographically disabled.

Groups of files are generally broadcast in a substantially continuous sequence. The invention is of particular utility when files are movies that are stored in set-top movie rental boxes that undergo content updates every month. New decryption keys may also be transmitted periodically, usually when content updates are broadcast. A group of 255 files may be broadcast, with each file having 15 five-second critical file segments, and with each critical file segment being replaced by 15 file segment variations, for example. Creation and broadcast of complete individually tailored files for each receiver is not commercially feasible due to the bandwidth requirements involved; the present invention requires only a small increase in broadcast bandwidth.

The broadcast also includes super codes that serve both as augmentation selection information to enable proper processing of files, and as traitor tracing information. The super codes preferably comprise an inner code and an outer code that operate in a nested manner. An inner code codeword describes which combinations of file segment variations should be selected by a particular receiver. An outer code describes which inner code codeword is pertinent to a given receiver in each file. The inner code and the outer code are selected (by error correcting codes, preferably Reed-Solomon codes) to each be maximally different, to reduce the likelihood of a group of receivers having identical augmentation selection information.

Each broadcast may vary the assignment of inner code randomly so that the pattern of file segment variations employed is not repeated from one broadcast to the next. Similarly, the assignment of outer code in each broadcast may also vary randomly so that the pattern of files identified in a group is not repeated from one broadcast to the next. Alternately, the assignment of inner code and outer code may be varied according to the need to identify suspected traitor receivers as certainly as possible. Further, while the number of critical file segments and file segment variations may be kept constant for simplicity, the number of critical file segments and the number of file segment variations may be varied according to an estimate of how likely it is that a given file will be pirated.

In the event that a redistributed version of a file is detected, the augmentations of the file can be correlated with the augmentations assigned to various authorized receivers, to determine which receivers are traitors. The watermarks in the file segment variations are used to determine which variations have been rebroadcast. If, after many redistributed files have been detected, the segment variations are exactly the same as those that were decrypted by only a single receiver, then it is highly likely that particular receiver is the culprit. Likewise, if the file segment variations do not correspond to any single receiver, then it is clear that a set of compromised receivers are acting in concert, and the receivers that have the highest correlation with the rebroadcast segments are highly likely to be in the set. These probabilistic guesses can be replaced by certainties if the broadcasting agency has some way of knowing how many receivers are in the compromised set. The present invention can detect a much larger number of colluding attackers for a given bandwidth than prior solutions. If the coalition doing the illicit rebroadcasts distributes the segment variation keys instead of the files themselves, the situation becomes even easier. There is no longer a need to use the watermark detection step; the keys themselves identify the segment variation directly.

The foregoing objects are believed to be satisfied by the embodiment of the present invention as described below.

DETAILED DESCRIPTION OF THE INVENTION

Figure 1:
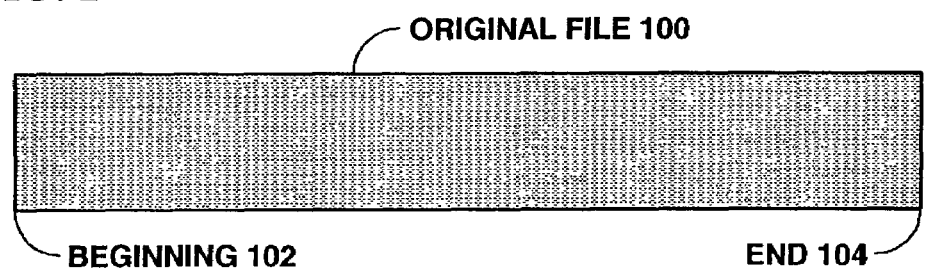
FIG. 1 is a diagram of an original file, according to an embodiment of the present invention.

Referring now to FIG. 1, a diagram of an original file 100 is shown, according to an embodiment of the present invention. Files may comprise any kind of digital data sequence, including but not limited to text, audio, images, video, music, movies, multimedia presentations, operating systems, software applications, and cryptographic keys. In broad terms, file 100 includes a beginning 102 and an end 104 and a span of data. Files 100 may be of any size and may be distributed by any means, including but not limited to computer networks, satellite networks, cable networks, television transmissions, and various physical storage media (e.g. CD-ROMs, DVDs, tapes, etc.) as are known in the art. Files 100 may be broadcast in groups in a substantially continuous sequence, for example, when a movie rental box's stored content of say 255 movies is updated, perhaps on a monthly basis. In the movie rental box scenario, among others, files are usually not encrypted and otherwise processed on the fly, but are processed ahead of time.

The present invention is not limited to the movie rental box implementation, but instead can be applied to any digital content subject to one-to-many distribution. For example, operators of a web server (generally referred to as a digital rights manager) that sells copyrighted content such as music or other material stored in a subscription database may not want to encrypt or otherwise process files on the fly because of the computational expense involved. Similarly, such a server cannot feasibly individually tailor nor store a complete copy of every file it transmits.

Figure 2:
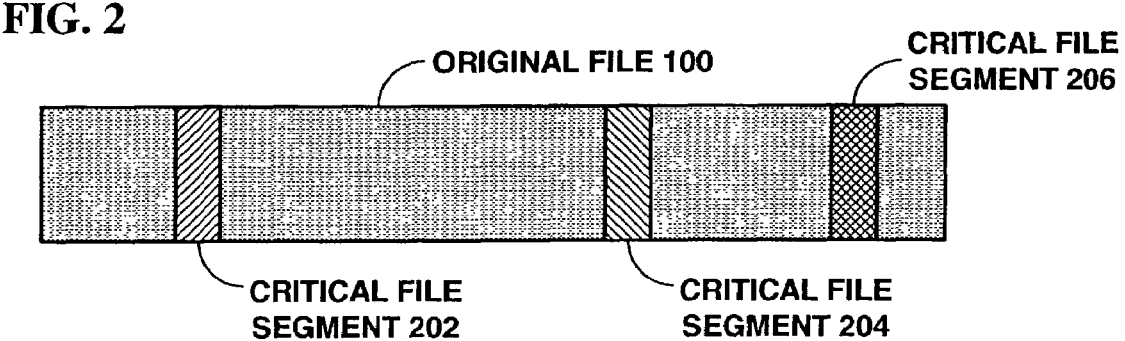
FIG. 2 is a diagram of critical file segments in an original file, according to an embodiment of the present invention.

Referring now to FIG. 2, a diagram of critical file segments 202, 204, and 206 in an original file are shown, according to an embodiment of the present invention. For clarity, only three critical file segments are shown; the preferred number is approximately 15. Not all data in a file 100 needs to be protected to the maximum possible level of security; bandwidth can be conserved by selectively applying different levels of security to the most valuable portions of a file 100. For example, in terms of the movie rental box scenario, each movie may have scenes that are each absolutely essential for the movie to be acceptable to any audience. All critical file segments in a file must therefore be properly processed for the file to be commercially desirable. The present invention preferably selects five-second scenes in a typical movie as critical file segments, but critical file segments of varying length are also encompassed by the present invention. The critical file segments are not necessarily equally distributed throughout a given file, in fact the critical file segments are preferably especially selected based on the contents of the file, possibly by human editors. In the case of executable software files, automated tools may identify critical file segments according to a measured execution frequency.

Figure 3A:
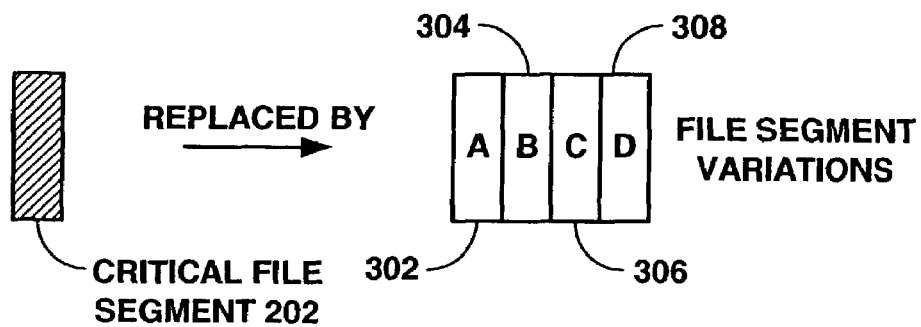
FIGS. 3A, 3B, and 3C are diagrams of file segment variations that will replace critical file segments, according to an embodiment of the present invention.
Figure 3B:
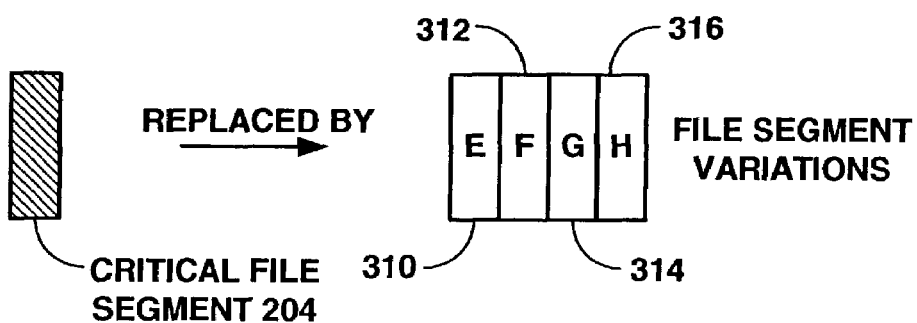
Figure 3C:
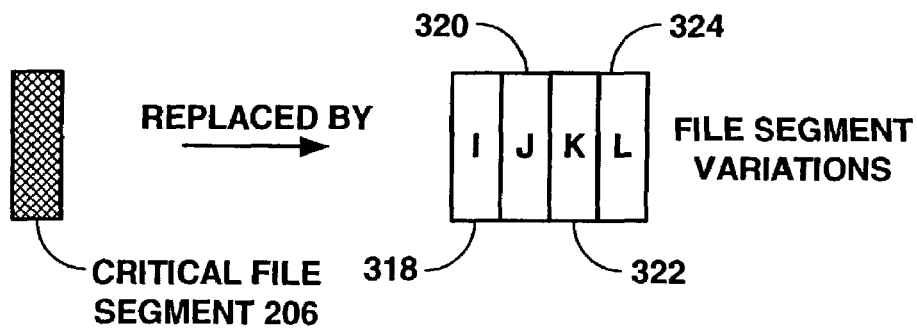

Referring now to FIGS. 3A, 3B and 3C, diagrams of file segment variations 302-324 that will replace critical file segments 202-206 are shown, according to an embodiment of the present invention. For clarity, only four file segment variations are shown for each critical file segment; the preferred number is approximately 16. Each file segment variation is simply a copy of the particular corresponding critical file segment that has been differently watermarked and differently encrypted. Each entire file is also typically watermarked and encrypted in a broadcast encryption system. Each file segment variation is identified by a text designation in this application (e.g. A, B, C . . . etc.) for clarity, but in practice binary numbers are generally employed for this purpose.

The number of critical file segments and the number of file segment variations preferably employed depends on the properties of the file and its audience. For movies, one could select a single critical file segment and have several hundred file segment variations; however, attackers might simply choose to omit that single critical file segment in a pirated copy of the file, in hopes that viewers would not find such a glitch to be overly annoying. A pirated movie with say 15 missing critical 5-second scenes is probably going to be too annoying to any viewer for it to be of any commercial value. Thus, the illegally broadcast movies are either substantially disrupted or the attackers must incorporate some of their file segment variations, which will facilitate traitor tracing.

While the number of critical file segments and the number of file segment variations may be kept constant for each file, modifying either number according to an estimated piracy likelihood for a given file is also within the scope of the invention. The number of file segments and the number of file segment variations will determine the amount of bandwidth overhead (or, alternately, the increased size of the broadcast version of the file). In a typical movie, use of 15 critical file segments each having 16 file segment variations each of 5 seconds' duration adds roughly 10% to the file size.

Figure 4:
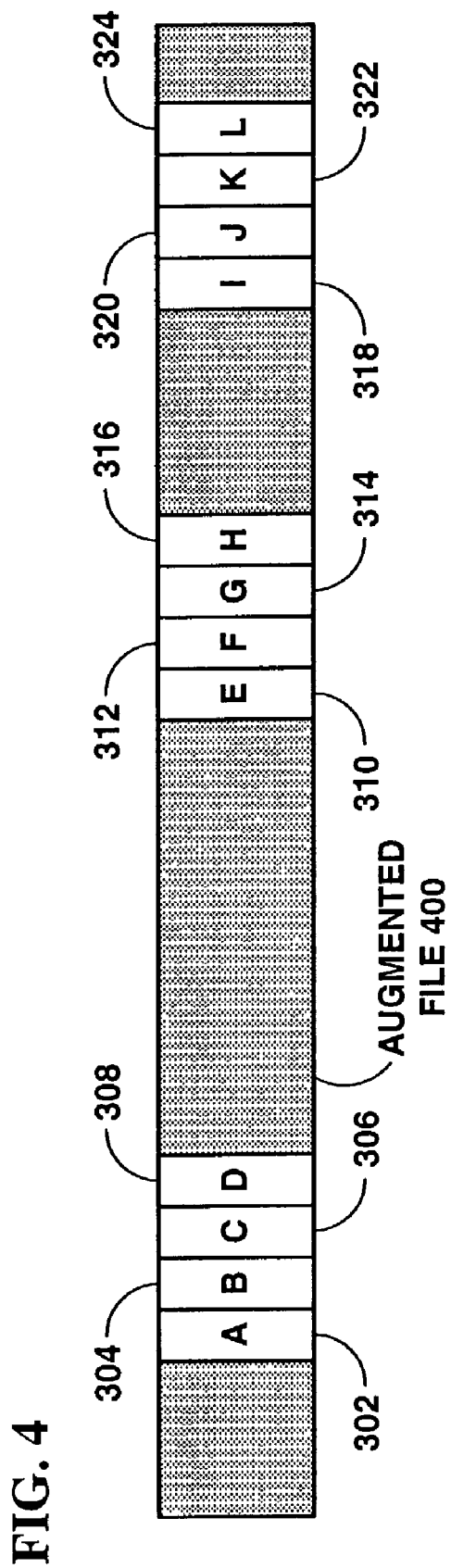
FIG. 4 is a diagram of an augmented version of a file including file segment variations, according to an embodiment of the present invention.

Referring now to FIG. 4, a diagram of an augmented file 400 including file segment variations 302-324 is shown, according to an embodiment of the present invention. The augmented file 400 is the version of the original file 100 that will actually be broadcast. Each intended receiver of the broadcast of a group of files requires augmentation selection information to choose a particular combination of file segment variations for each particular file. In terms of the movie rental box scenario, each movie rental box must know, for each movie, which set of variations to plug into the spaces where critical scenes existed in the original movie. The particular arrangement of unmodified file content and file segment variations within the augmented file 400 shown is not critical but is merely intuitive.

The augmentations employed by the present invention facilitate traitor tracing in a commercially viable (i.e. low bandwidth overhead) manner. If a pirated version of a file is found, say on the Internet, the identity of the particular movie rental box (or boxes) that were used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single movie rental box, prior art systems would normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated. From the attackers' point of view, the ideal situation is if they redistribute movies including variations such that an innocent third party appears to be the culprit. Such redistribution may not occur right away, but may follow a so-called "delayed attack". This complicates the task of traitor tracing, and emphasizes the need to prevent all attacks as much as possible for every broadcast. In the present invention, the watermarks in the file segment variations are used to determine which variations have been rebroadcast.

Therefore, the present invention performs two complimentary tasks: choosing which file segment variation to employ at each critical file segment of each file for each receiver box, and upon observing a redistributed file or decryption keys, identifying (and preferably subsequently disabling) traitors with the assistance of variation assignment information. The present invention can detect a larger number of colluding attackers for a given bandwidth than any known solution. It is literally an order of magnitude better than some naive schemes that have been suggested.

Figure 5:
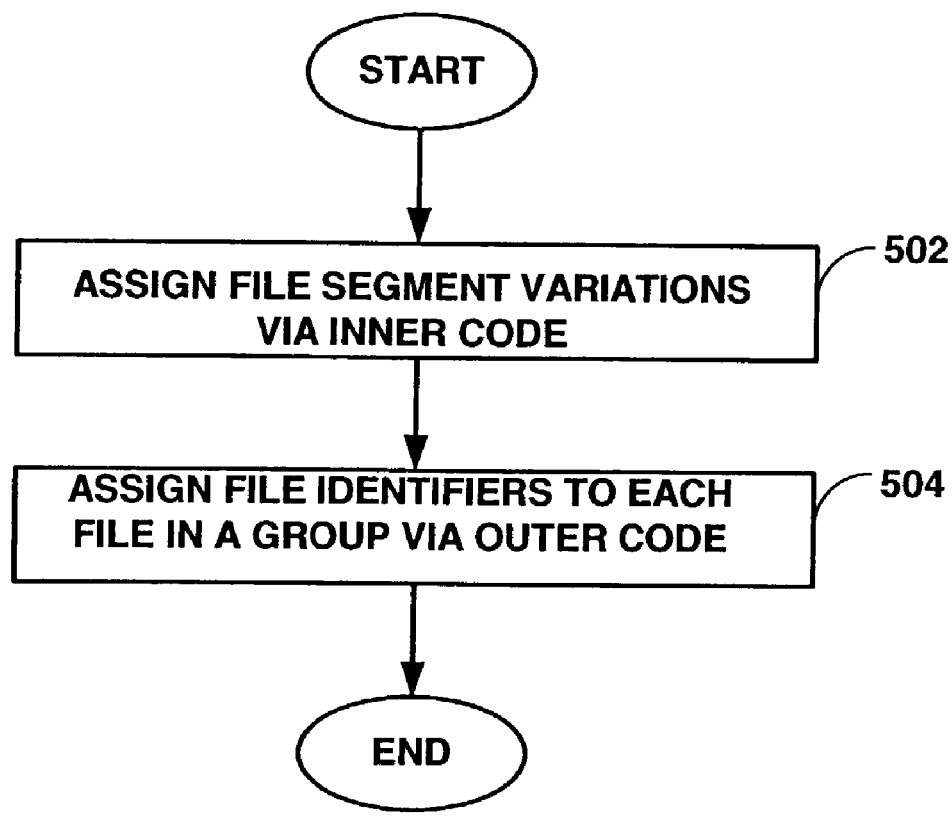
FIG. 5 is a flowchart of the method of assigning super codes, according to an embodiment of the present invention.

Referring now to FIG. 5, a flowchart of the method of assigning super codes is shown, according to an embodiment of the present invention. The super codes serve both as augmentation selection information to enable proper processing of files, and as traitor tracing information. The super codes preferably comprise an inner code and an outer code that operate in a nested manner. In step 502 a maximally different inner code codeword is created for each critical file segment variation in each file, as described in more detail below. An inner code codeword describes which combinations of file segment variations should be selected by a particular receiver. Note that at this point the exact location of each critical file segment in each file and its contents may not have been determined, though codewords are selected. Then, in step 504 each file in a group of files is assigned a file identifier according to a maximally different outer code codeword, also to be described below. An outer code describes which inner code codeword is pertinent to a given receiver in each file. The inner code and the outer code are selected (by error correcting codes, preferably Reed-Solomon codes) to each be maximally different, to reduce the likelihood of a group of receivers having identical augmentation selection information. Each group of files typically has a different super code.

The assignment of inner codes may vary randomly so that the pattern of file segment variations employed is not repeated from one broadcast to the next. Similarly, the assignment of outer codes in each broadcast may also vary randomly so that the pattern of files identified in a group is not repeated from one broadcast to the next. Alternately, the assignment of inner codes and outer codes may be varied according to the need to identify suspected traitor receivers as certainly as possible. Further, while the number of critical file segments and file segment variations may be kept constant for simplicity, the number of critical file segments and the number of file segment variations may be varied according to an estimate of how likely it is that a given file will be pirated.

Figure 6:
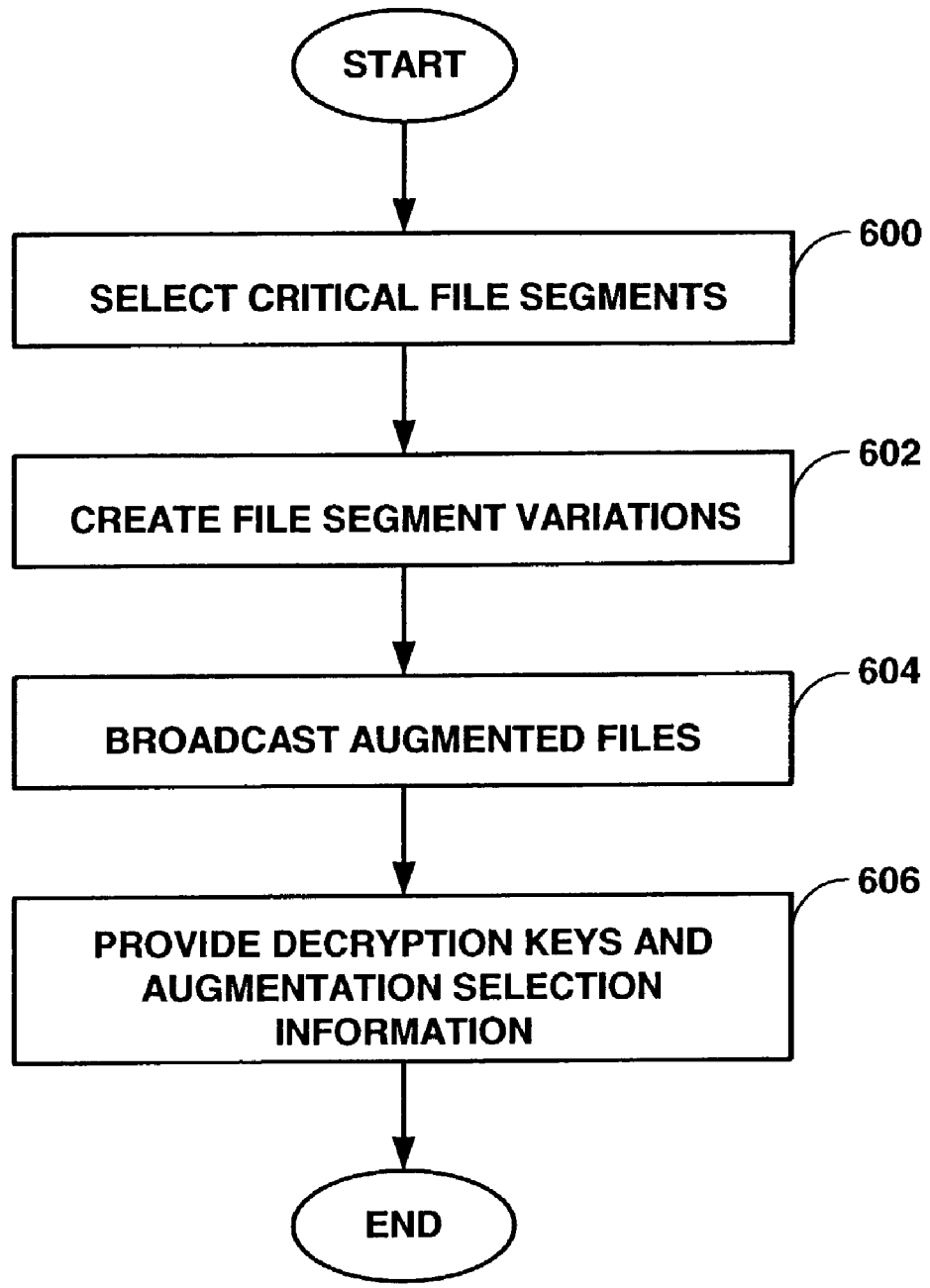
FIG. 6 is a flowchart of the method of preparing files for transmission, according to an embodiment of the present invention.

Referring now to FIG. 6, a flowchart of the method of preparing files for transmission is shown, according to an embodiment of the present invention. For each file, at least one critical file segment (as shown in FIG. 2) is selected in step 600. For each critical file segment, at least one file segment variation (as shown in FIGS. 3A, 3B, and 3C) is created in step 602 to replace each critical file segment, forming an augmented file (as shown in FIG. 4). In step 604, the group of augmented files is broadcast. Finally in step 606, each group of files is assigned to one receiver box via a super code and a new set of decryption keys provided to the authorized receivers. The super code determines the assignment of decryption keys to each receiver, i.e. each receiver acquires decryption keys only for the particular file segment variations that will be used by that receiver.

The present invention treats the assignment of variations as a coding problem, instead of merely randomly choosing the variations for each box. In other words, when assigning error correcting codes one wants each codeword to be maximally different from every other codeword. Unfortunately, some error correcting codes are impractical because they require many more variations than are allowed by the real-world available bandwidth constraints. The present invention avoids the bandwidth problem by having a small number of variations at any single point by nesting two small codes to form an overall or super code. Combinations of file segment variations in each file are assigned according to an inner code. In terms of the text labels describing the file segment variations 302-324 in this application, the inner code that describes which file segment variations in augmented file 400 might be <AFL> for example, indicating that file segment variation 302 should be selected instead of file segment variations 304, 306, and 308, that file segment variation 312 should be selected instead of file segment variations 310, 314, and 316, and that file segment variation 324 should be selected instead of file segment variations 318, 320, and 322.

A file identifier that describes which combination corresponds to which file in a group of files is assigned according to an outer code. For example, the inner code <AFL> might apply to file number 123. The invention preferably employs Reed-Solomon codes, but all coding methods are within the scope of the invention.

For example, using a Reed-Solomon inner code for 15 critical file segments each having 16 file segment variations, there are 256 different codewords assigned to boxes. Because of the properties of the code, that means that if one picks any two boxes, the boxes will either have an identical assignment of file segment variations, or at least 14 out of the 15 points will have different variations.

Using a Reed-Solomon outer code for a group of 255 files, for example, there are 256 different codewords assigned to file identifiers. Thus, if there are 16 million boxes, each assigned to a unique super code, each box will have the same inner code assignment in at most two files. Any two boxes will differ in the inner code assignment in at least 253 files, and in each one of those, they will have at least 14 different points, so the difference between the two boxes spans at least 253×14 or 3542 variations.

Figure 7:
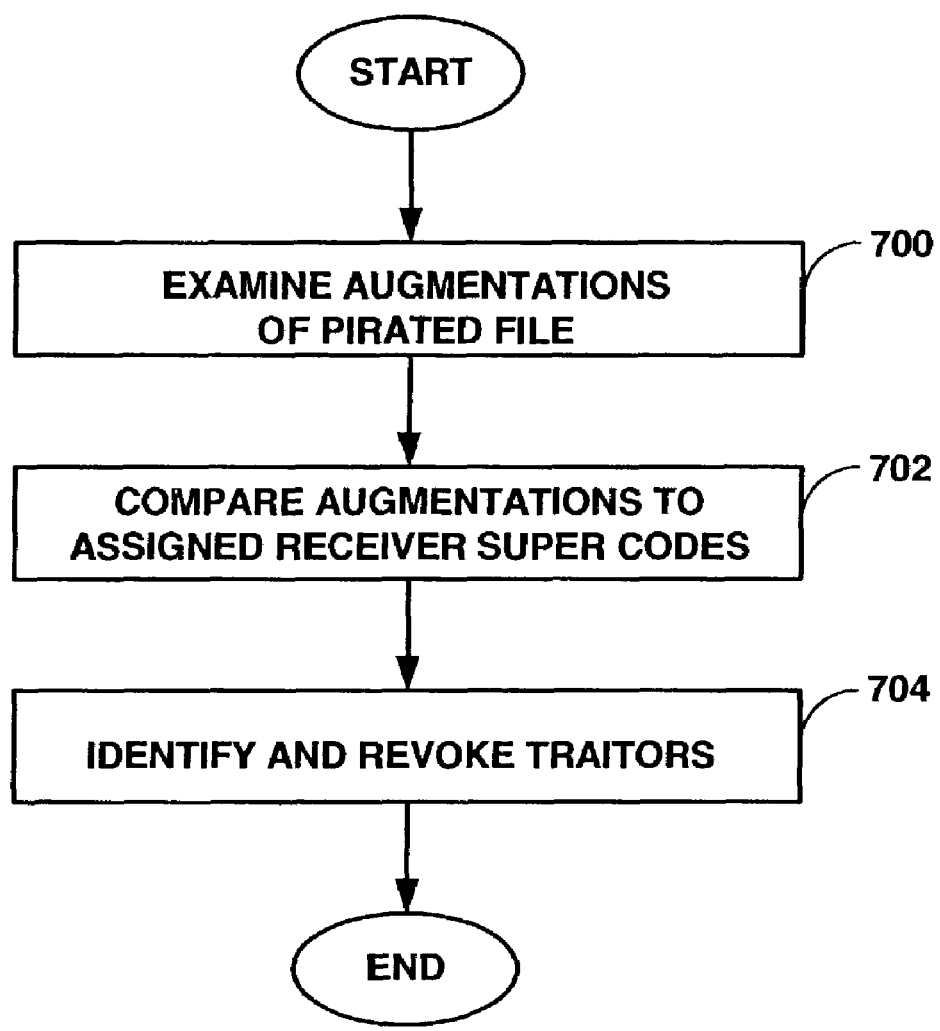
FIG. 7 is a flowchart of the method of identifying and disabling traitor receivers, according to an embodiment of the present invention.

Referring now to FIG. 7, a flowchart of the method of identifying and disabling traitor receivers is shown, according to an embodiment of the present invention. First, in step 700, a redistributed or pirate version of a file is examined to determine its augmentations, which include the particular file segment variations it contains. Next, in step 702, a comparison is made between the augmentations and the super codes previously assigned to authorized receivers, to determine which receiver (or receivers) are most likely compromised. Finally, in step 704, when a traitor is traced, the dynamic subset of users authorized to receive the broadcast is changed by simply dropping the traced traitor from it; legal action may also be instituted at this point.

The examination includes calculating, preferably for each box, the number of file segment variations that a box matches with each observed illicit file. The examination can reveal a single movie rental box having every assigned file segment variation that was used in the pirated movie and reveal that the watermarks used also match, for a deterministic identification of the traitor. While prior art systems try to determine the traitor as quickly as possible by analyzing a single file, in the case where attackers are colluding this approach doesn't adequately distinguish the culprits. Instead, with the super code design of the present invention there may be thousands of boxes that will have exactly the same variations for a given file (as determined by the inner code), but these boxes will be distinguished in subsequent movies via the outer code. Since an attack is only economically hurtful if the attackers rebroadcast many movies, the approach is exactly right. A single group of movies, corresponding to a single super code, can be sufficient to identify a group of colluding traitors.

Further, the comparison may include a count of the number of watermarked file segment variations in the pirated file corresponding to each box among a number of boxes collectively compromised by colluding attackers. A ranked list of boxes can be generated according to the number of each box's file segment variations used in the pirated file. The box that has the most matchings with the redistributed movie is incriminated, and will not be given any new decryption keys. In other words, a list of suspected traitors can be generated according to the number of file segment variations from each that are used in an illicit copy. Thus, even when the suspected traitor numbers become too big for a deterministic identification, the present invention can probabilistically identify and disable the compromised box without harming innocent users.

It is also within the scope of this invention to exclude more than one box for each super code sequence. In other words, the broadcaster can exclude the top two boxes, or the top three boxes, etc. This defeats the attack sooner, but at the cost of increasing the chance of falsely incriminating an innocent device along the way. Of course, there might be non-technical ways to help tell the difference between innocent and colluding boxes. For example, if a consumer calls to complain that her box no longer works, and is willing to have a service man come to her house to fix it, she is likely to be innocent.

The method is repeated for the next super code group of files, e.g. the next group of 255 movies. Eventually the attack will stop because all compromised boxes will have been excluded.

The attackers should not be able to calculate the actual assignments for any boxes but their own; if they could, that might help them incriminate an innocent box. Therefore, an additional feature of the invention is to randomly permute code assignments at each code position (each critical file segment in the movie), and in each movie itself. For example, if a Reed-Solomon code would suggest that a given box should get variation #1 at a certain point in a certain movie, the assignment of variation number to the actual broadcast order will have been permuted, so that variation #1 is rarely the first variation broadcast.

If there are a large number of colluding boxes (e.g. dozens), it may be difficult to condemn any single box after the first 255 movies have been broadcast. It is a simple matter to continue the process with the next group of movies. However, it is probably a bad idea to make exactly the same assignment of boxes to codes in the new group of movies, because then the same innocent box will have a high overlap with the traitors. It is an additional feature of the invention to change the assignment of the super code to boxes after each super code sequence. All such new assignments are within the scope of the invention, including random assignments and code assignments that are calculated to correspond to particular boxes to more effectively identify suspected traitors.

The best super code is generated when the inner code has k=2. This well-known parameter of error correcting codes determines the number of codewords; if q is the number of variations at each point, the number of codewords is qk. All values of the k parameter are nonetheless within the scope of the invention.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for disabling at least one traitor receiver in a broadcast encryption system, comprising:
    examining augmentations of at least one redistributed version of at least one file in a group of files, wherein each authorized receiver acquired decryption keys only for the particular augmentations that it used;
    for at least one possible receiver and for at least one file, determining a level to which said augmentations correspond to a first set of super codes previously assigned to each authorized receiver;
    concluding, responsive to said level, that a number of said receivers are traitor receivers; and
    selectively revoking a number of said receivers concluded to be traitor receivers according to said level;
    repeating said examining by broadcasting said group of files in said broadcast encryption system by selecting another set of super codes; and
    wherein said first set of super codes and said another set of super codes are selected to reduce number of said authorized receivers concluded to be traitor receivers by examining augmentations of additional redistributed files in said group of files; and wherein said first set of super codes and said another set of super codes are selected such that said number is made larger to achieve quicker revocation of a traitor receiver at the cost of increasing chance of an incorrect revocation of an innocent receiver.

2. The method of claim 1 wherein said files include digital forms of at least one of: a cryptographic key, a super code, an inner code codeword, an outer code codeword, text, audio, an image, video, a multimedia presentation, music, a movie, an operating system, a video game, and a software application.

3. The method of claim 1 wherein said super code includes:
    an inner code codeword assigning file segment variations in each file; and
    an outer code codeword assigning file identifiers to files.

4. The method of claim 1 wherein said augmentations include at least one watermark.

5. The method of claim 4 wherein said at least one watermark corresponds to at least one file segment variation.

6. The method of claim 1 wherein said concluding is deterministic.

7. The method of claim 1 wherein said concluding is probabilistic.

8. The method of claim 1 wherein said concluding minimizes a probability of falsely concluding an innocent receiver is traitorous.

* * * * *